United States Patent
Safadi et al.

(12)

(10) Patent No.: US 6,810,525 B1
(45) Date of Patent: Oct. 26, 2004

(54) IMPULSE PAY PER USE METHOD AND SYSTEM FOR DATA AND MULTIMEDIA SERVICES

(75) Inventors: Reem Safadi, Horsham, PA (US); Eric J. Sprunk, Carlsbad, CA (US); Doug Makofka, Willow Grove, PA (US); Ray Bontempi, Jamison, PA (US)

(73) Assignee: General Instrument Corporation, Horsham, PA (US)

( * ) Notice: Subject to any disclaimer, the term of this patent is extended or adjusted under 35 U.S.C. 154(b) by 717 days.

(21) Appl. No.: 09/631,328

(22) Filed: Aug. 3, 2000

Related U.S. Application Data

(60) Provisional application No. 60/149,263, filed on Aug. 17, 1999.

(51) Int. Cl.[7] .............................................. H04N 7/173
(52) U.S. Cl. ................... 725/1; 725/4; 725/5; 725/104; 725/86; 725/93; 380/231; 380/232; 380/241; 705/67
(58) Field of Search ............................. 725/104, 86, 87, 725/93, 100, 1, 2, 5, 6, 8, 25, 31, 4, 103; 380/200, 211, 231, 232, 233, 234, 239, 241; 705/54, 57, 59, 67; H04N 7/173

(56) References Cited

U.S. PATENT DOCUMENTS

| | | | | |
|---|---|---|---|---|
| 4,792,973 A | * | 12/1988 | Gilhousen et al. | 380/231 |
| 4,975,951 A | * | 12/1990 | Bennett | 380/231 |
| 5,003,384 A | | 3/1991 | Durden et al. | |
| 5,247,575 A | * | 9/1993 | Sprague et al. | 705/53 |
| 5,634,848 A | * | 6/1997 | Tsuda et al. | 463/25 |
| 5,671,276 A | | 9/1997 | Eyer et al. | |
| 5,675,647 A | * | 10/1997 | Garneau et al. | 380/239 |
| 5,862,220 A | | 1/1999 | Perlman | |
| 6,157,377 A | * | 12/2000 | Shah-Nazaroff et al. | 345/719 |
| 6,289,314 B1 | * | 9/2001 | Matsuzaki et al. | 705/1 |
| 6,292,568 B1 | * | 9/2001 | Akins et al. | 380/239 |
| 6,314,572 B1 | * | 11/2001 | LaRocca et al. | 725/60 |
| 6,374,402 B1 | * | 4/2002 | Schmeidler et al. | 717/167 |
| 6,424,717 B1 | * | 7/2002 | Pinder et al. | 380/239 |
| 6,466,671 B1 | * | 10/2002 | Maillard et al. | 380/227 |
| 2003/0140340 A1 | * | 7/2003 | Bertram | 725/29 |

FOREIGN PATENT DOCUMENTS

WO    WO 99/22507    5/1999

* cited by examiner

*Primary Examiner*—John Miller
*Assistant Examiner*—Nathan A Sloan
(74) *Attorney, Agent, or Firm*—Barry R. Lipsitz; Douglas M. McAllister

(57) ABSTRACT

A method and system are provided for impulse purchasing of services over a communication network, such as a cable or satellite television network. Such services can include games or information accompanying television programming, home-shopping, e-mail services, streaming media and the like. Security is provided through entitlements generated by the access controller 14 and entitlement tokens generated by a secure processor. The secure processor is located at a subscriber terminal 16 through which a subscriber orders and obtains the services. A token is generated when the subscriber either selects the service, if pre-authorized, or when the service is purchased on impulse. The token is secure and signed, and may be used by a policy/proxy server 18 subtending to the Network Operator's ISP and associated services to further facilitate offering these services to the subscribers.

32 Claims, 2 Drawing Sheets

IMPULSE PAY PER USE METHOD AND SYSTEM FOR DATA AND MULTIMEDIA SERVICES

This application claims the benefit of U.S. provisional patent application No. 60/149,263 filed Aug. 17, 1999.

BACKGROUND OF THE INVENTION

The present invention relates to communications networks such as cable television, satellite television and computer networks over which services are available for a fee, and more particularly to a method and system for allowing data and multimedia services to be purchased over such networks.

Cable and satellite television networks where video services are available for a fee are well known. Also well known are computer network services such as the Internet, America On-Line, Compuserve and others having web sites with different types of applications ranging from general information to entertainment to electronic shopping, all of which can be accessed for a fixed monthly fee. In the past, cable and satellite television networks have provided individual television services on an impulse purchase basis. Such "impulse pay-per-view" (IPPV) services include television movies or special sports events in which a viewer can order a service upon payment of a fee.

The provision of pay-per-view services is desirable from a consumer's standpoint since the consumer need only pay for those services which are desired and offered at times that the consumer is able to enjoy them. The success of pay-per-view services, whether they be movie or sports events, has prompted system operators and programmers to consider additional types of services to be offered using the pay-per-view approach.

One outgrowth of the pay-per-view approach would be the ability to offer services based on data and multimedia applications. Such services may include, without limitation, games or information accompanying the television programming, home-shopping, e-mail services, and the like. In order to provide such services, acceptable security measures must be implemented. In the subscription television field, such as satellite and cable television, security is provided using conditional access (CA) techniques.

It would be advantageous to extend television IPPV conditional access to services based on new applications. It would be particularly advantageous to extend such conditional access without requiring a new infrastructure to support these features, i.e., by providing simple extensions to already deployed systems. It would be further advantageous to enable subscriber terminals, such as set-top boxes previously used solely for video IPPV services, to provide "impulse pay per use" (IPPU) services for applications other than video or accompanying the video.

The present invention provides methods and Systems having the aforementioned and other advantages.

SUMMARY OF THE INVENTION

A method and system are provided for allowing secure impulse pay-per-use (IPPU) services to be obtained over a communication network.

In a simplified embodiment, a subscriber IPPU selection is sent by a subscriber (e.g., via telephone in the case of call-ahead entitlement or via the subscriber terminal in the case of pre-authorized entitlement) to an access controller. The access controller generates an encrypted message having a service identifier and associated authorization settings related to the subscriber IPPU selection, which encrypted message is then sent from the access controller to the subscriber terminal, together with the cost of the IPPU service selected by the subscriber. The subscriber terminal verifies that the cost of the IPPU selection is within a credit entitlement of the subscriber. If such verification is successful, the subscriber terminal generates a secure entitlement token for use by a client application residing in the subscriber terminal. The entitlement token may alternatively be generated by the access controller and forwarded to the subscriber terminal. The client application will then send the entitlement token to a server (e.g., a proxy/policy server) in a secure manner in order to determine the status of the subscriber's entitlement to receive the IPPU selection. If the subscriber's entitlement to receive the IPPU selection is verified, the server will further process the IPPU selection for further enabling the selected service/application for use by the viewer.

The server can be an independent Internet Service Provider (ISP) proxy/policy server, an ISP proxy/policy server affiliated with a Multiple System Cable Operators' (MSO) or other Network Operators' (NO) proxy/policy/policy server, an Network Operator proxy/policy/policy server, or the like.

In an alternate embodiment, the IPPU selection is first sent to a customer response center (CRC)/billing system, which in turn forwards the IPPU selection to the access controller. The billing system bills the subscriber for the IPPU selection.

In the case of a "Cyber CRC" configuration, where communications are provided over a global communication network (e.g. the Internet) or the like, the subscriber IPPU selection can be sent to the CRC/billing system via a web browser running at the subscriber terminal and a web server at the billing system.

As part of the communication with the access controller, the billing system can actuate the access controller to add the service referred to by the subscriber IPPU selection, which is a separate process from that which tells the access controller which subscribers are entitled to access the service.

The term "billing system" as used herein, as well known in the industry, is much broader than just a billing computer. Generally, the billing system refers to the business system that runs the Network Operator operation, and includes functions such as billing, system configuration and business operations.

In an alternate embodiment, the secure entitlement token is a signed and encrypted entitlement token, which signed and encrypted entitlement token is securely sent from the client application to the server for authentication and decryption. The entitlement token may be encrypted using, for example, the subscriber's private key. The proxy/policy server can then use the subscriber's public key to decrypt the entitlement token. Alternatively, the token may be encrypted using Data Encryption Standard (DES) techniques symmetric key encryption, and sent along with the DES key which is encrypted using a public key associated with the server (DES is an encryption standard which is described in U.S. Pat. No. 3,962,593). The server then uses its private key to decrypt the DES key and uses the decrypted DES key to decrypt the token. The entitlement token may be generated at the access controller or at the subscriber terminal.

In a further embodiment, the service identifier is associated with one or more service related codes and data objects which are sent periodically from the access controller to the subscriber terminal.

The access controller may be a local access controller or a national access controller.

The IPPU services may consist of accessing certain cites, streaming media from the sites, downloading multimedia applications from the sites, accessing content resident on the sites, shopping, email, video mail, or the like.

The subscriber terminal may be a cable television set-top box, a digital television or host with point of deployment capability, a personal computer, or the like.

In an alternate embodiment, the subscriber IPPU selection is pre-authorized at the subscriber terminal for a predetermined credit amount. Pre-authorization for IPPU allows a subscriber to request authorization locally (e.g., in the subscriber terminal). The subscriber terminal can subtract the cost associated with the subscriber IPPU selection from the credit amount.

To protect against repudiation of the IPPU selection, the subscriber terminal can securely report the subscriber IPPU selection back to the access controller.

Corresponding methods and systems are provided.

DETAILED DESCRIPTION OF THE INVENTION

In accordance with the invention, the impulse pay-per-view concept previously associated with television services is extended to impulse pay-per-use (IPPU) services associated with supplementary data and multimedia applications and the like. The term "use" refers to the act of utilizing either subscriber terminal resources or code/data objects. Such objects comprise software code and/or data, and may be resident in the subscriber terminal or downloaded.

The invention securely entitles subscribers to purchase services on impulse. Such services may or may not rely on real time interaction with the network for delivering the service. In particular, a secure microprocessor in the subscriber terminal is provided with hardware and/or software to enable the secure processor to generate an entitlement token which is secure and signed, and may be used by the ISP's or Network Operator's proxy/policy server prior to further processing by a server associated with a given service. The token is generated when a subscriber either selects a service (if pre-authorized) or purchases such a service on impulse. Such an IPPU purchase will utilize components resident in the subscriber terminal as well as applicable network components that support IPPU purchase transactions.

Various system elements are used in providing IPPU services in accordance with the invention. These include:
1. Customer Response Center (CRC): Where a subscriber's order forms (via Cyber Customer Service Representative (CSR) or other means) and order calls are processed (typically used in call ahead services).
2. Existing Network Operator Billing System NO-BS: The existing MSO billing system interfaces to a national controller (Access Controller-AC) or a local controller (Digital Access Controller-DAC). Typically, access requirements and authorization rights (entitlements) are conveyed from the Billing System.
3. Internet Service Provider Billing System (ISP-BS): This is the Network Operator's partner Internet Service Provider's (ISP) existing billing system (optional), which handles ISP services.
4. AC/DAC: Access controllers which control the authorization and purchase collection of services on a subscriber basis.
5. Subscriber terminal: A device such as a cable television set-top box, a digital television or host with point of deployment capability, a personal computer, or the like that offers video, audio and data services based on subscription, call-ahead, or impulse pay.

Figure 1:
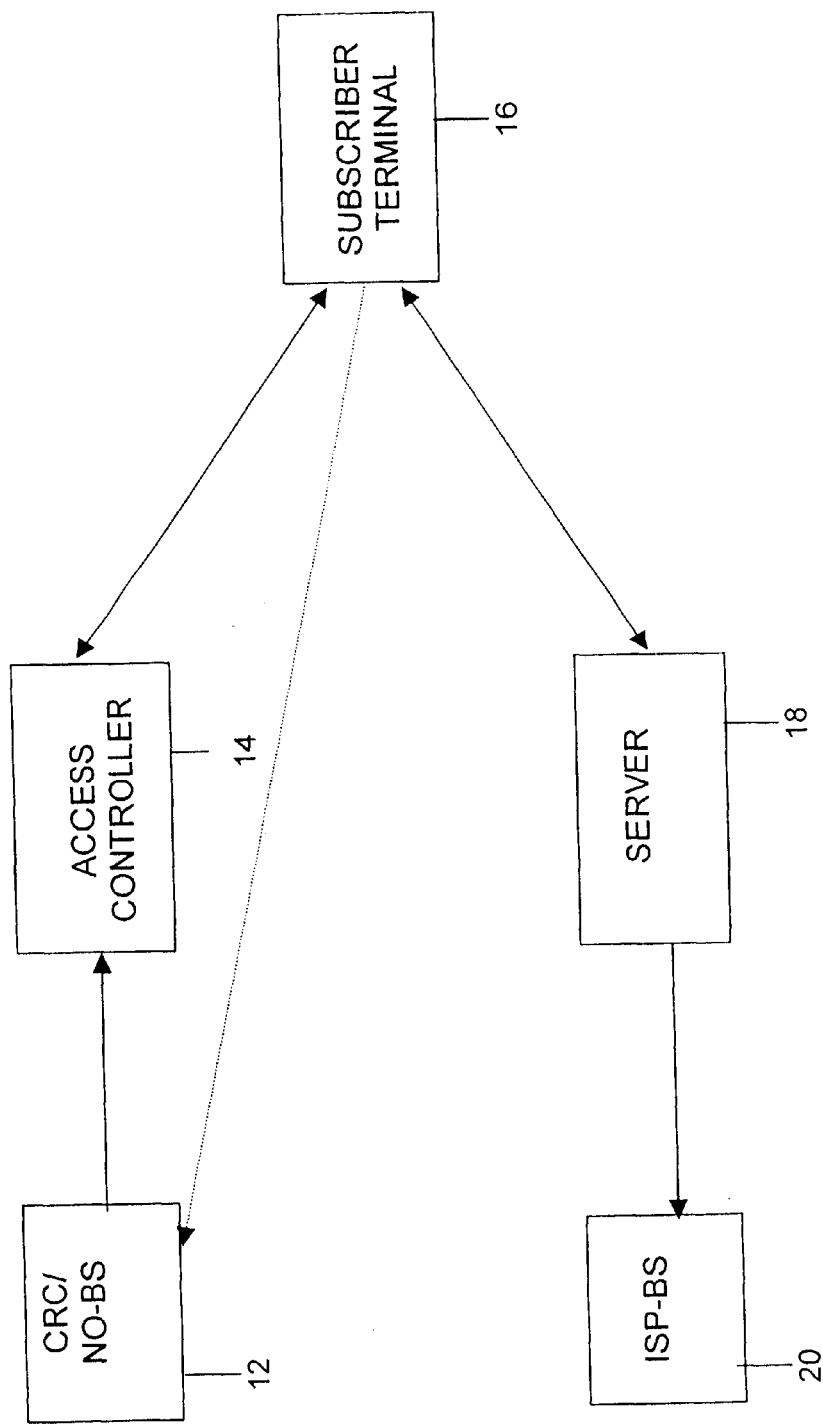
FIG. 1 is a block diagram of the system in accordance with the present invention.
Figure 2:
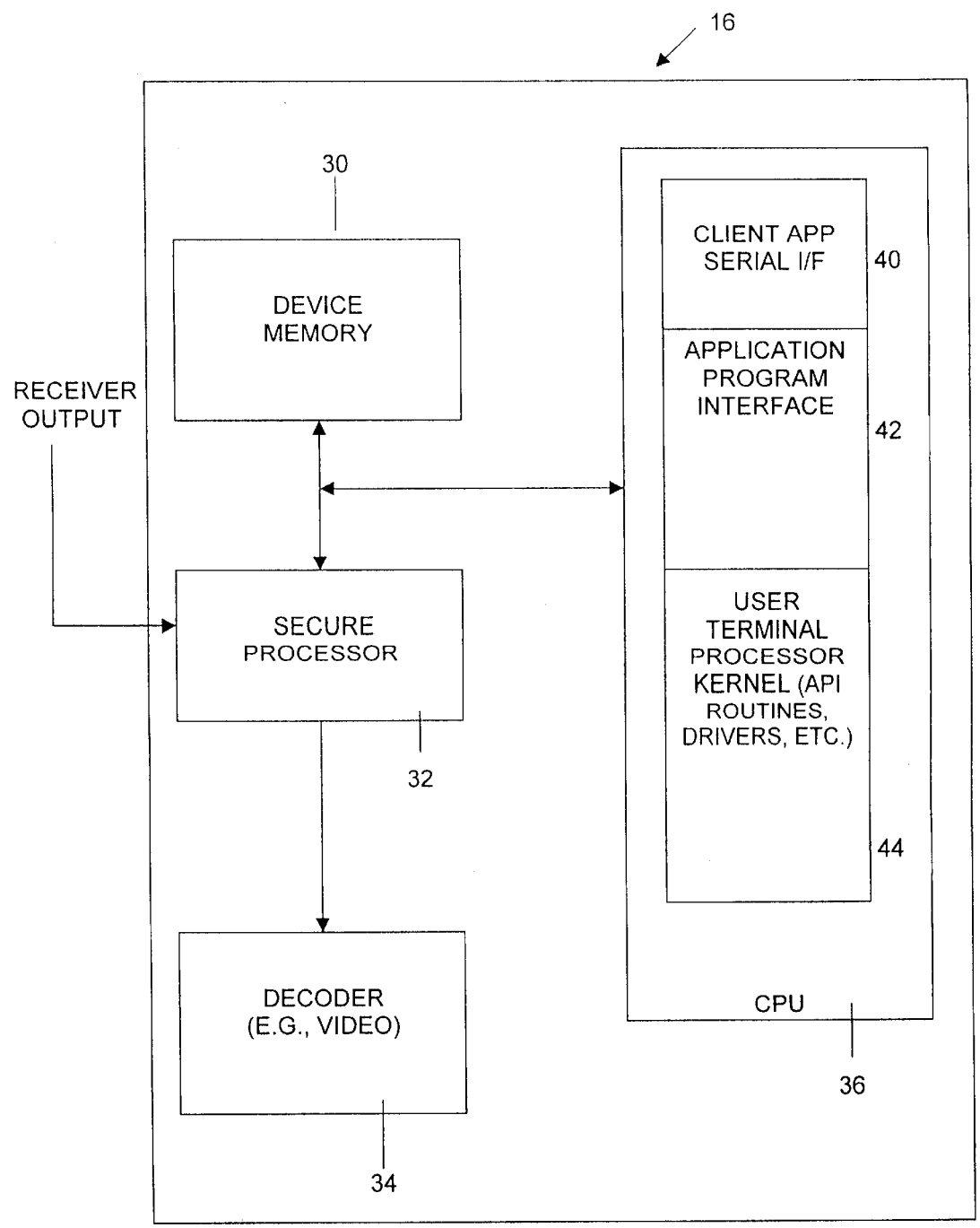
FIG. 2 is a block diagram of the relevant components of a subscriber terminal in accordance with the present invention.

The invention is best illustrated in terms of the various transaction flows between the relevant elements, as shown in FIGS. 1 and 2. Before referring to the Figures, however, it should be noted there are multiple applicable scenarios under which the present invention can be utilized. These include:
1. Call-Ahead Entitlement/Authorization
   1.1 Carouseled applications (services)
   1.2 Server based applications (services)
   1.3 Streaming media services
2. Impulse purchase Entitlement/Authorization
   2.1 Carouseled applications (services)
   2.2 Server based applications (services)
   2.3 Streaming media services Both of the carouseled application scenarios noted above can be achieved in a manner similar to call-ahead and IPPV of video services. In particular, the subscription and impulse tiers within the conditional access system are associated with service-identifiers which themselves may be associated with one or more service related code and data objects. These objects are carouseled (i.e., sent periodically) on either the out-of-band or a given in-band channel which corresponds to the offered service. The authorization tier is conveyed in an encrypted message and delivered as such to a secure processor in the subscriber terminal.

If a consumer wishes to purchase a service marked as IPPU, and if he possesses the authorization tier that enables IPPU purchase in general, and if the network has granted him adequate credit, then the consumer can command the purchase directly to the subscriber terminal without the involvement of the network. The subscriber terminal will later report this purchase back to the network in a secure manner, either when requested or autonomously.

The server based applications scenarios, on the other hand are more involved. This is due to the fact that certain actions are required by the server (or proxy server) in order to facilitate the use of the selected service/application by the viewer. Such services may include, for example, accessing certain sites, downloading programs from these sites, or accessing content (e.g. streaming media content) resident on these sites. The policy/proxy server requires a secure mechanism to determine whether the subscriber is legitimately entitled to the selected service. The mechanism must be secure to guard against workarounds where a purchase is not registered but an entitlement token (encrypted, signed or otherwise) shows that the subscriber is entitled for a sought after service.

The set of impulse-purchasable services (e.g., multimedia applications, home shopping, e-mail, and the like) are associated with corresponding service-identifiers (service_id) that are recognized by both the Network Operator's and the ISP's billing systems. Call ahead service tiers and/or IPPU tiers are associated with each service for each subscriber. Each service_id may have a non zero cost associated with it.

In one embodiment as shown in FIG. 1, a subscriber IPPU selection is sent by a subscriber to an access controller 14 (e.g., via telephone in the case of call-ahead entitlement or via the subscriber terminal in the case of pre-authorized entitlement). The access controller 14 generates an encrypted message having a service identifier and associated authorization settings (e.g., authorization tier settings) related to the subscriber IPPU selection, which encrypted message is then sent from the access controller 14 to the subscriber terminal 16. The same message (or a separate message) may include the corresponding cost of the IPPU selection.

The subscriber terminal 16 verifies that the cost of the IPPU selection is within a credit entitlement of the subscriber. If such verification is successful, the subscriber terminal 16 generates (e.g., by a secure processor located in the subscriber terminal) a secure entitlement token for use by a client application residing in the subscriber terminal 16. Alternatively, the entitlement token may be generated by the access controller 14 and forwarded to the subscriber terminal 16. The client application will then send the entitlement token to a server 18 in a secure manner in order to determine the status of the subscriber's entitlement to receive the IPPU selection. If the subscriber's entitlement to receive the IPPU selection is verified, the server 18 will further process the IPPU selection to facilitate the use of the service/application by the viewer.

The server 18 can be an independent Internet Service Provider (ISP) proxy/policy server, an ISP proxy/policy server affiliated with a Network Operator (MSO) proxy/policy/policy server, an Network Operator proxy/policy/policy server, or the like.

In an alternate embodiment, the IPPU selection is first sent to a customer response center (CRC)/billing system 12, which in turn forwards the IPPU selection to the access controller 14. The billing system 12 bills the subscriber for the IPPU selection. The CRC may be a part of the Network Operator billing system as shown in FIG. 1, or the CRC may be a separate entity. The CRC informs the billing system of the call-ahead (or cyber) subscriber selections and sends that information to the Network Operator billing system (NO-BS).

In the case of a "Cyber CRC" configuration, where communication is provided over a global communication network (e.g. the Internet) or the like, the subscriber IPPU selection can be sent to the CRC/billing system 12 via a web browser running at the subscriber terminal 16 and a web server at the billing system 12.

The server may also inform the ISP's billing system 20 (ISP-BS) about the purchase transaction. In Network Operator systems where there is one Network Operator billing system for all services, the ISP's billing system 20 is actually part of or the same as the Network Operator's billing system 12.

Depending on the billing model, the subscriber terminal 16 may subtract a subscription fee associated with IPPU (one time purchase until terminated), and the ISP-BS 20 may charge an additional transaction fee. Alternatively, the subscriber terminal 16 may only register the purchase and convey the entitlement (as mentioned above) with no charge. The ISP's billing system 20 may then apply the charge.

As part of the communication with the access controller 14, the billing system 12 can actuate the access controller 14 to add the service referred to by the subscriber IPPU selection, which is a separate process from that which tells the access controller 14 which subscribers are entitled to access the service.

The term "billing system" as used herein, as well known in the industry, is much broader than just a billing computer. Generally, the billing system refers to the business system that runs the Network Operator operation, and includes functions such as billing, system configuration and business operations.

In an alternate embodiment, the secure entitlement token is a signed and encrypted entitlement token, which signed and encrypted entitlement token is securely sent from the client application to the server 18 for authentication and decryption.

The entitlement token may be encrypted using, for example, public key/private key methods and/or DES encryption methods. The subscriber terminal 16 will pass the encrypted entitlement token on to the server 18 for determination of entitlement. The entitlement token may be generated at the access controller 14 or at the subscriber terminal 16.

In a further embodiment, the service identifier is associated with one or more service related codes and data objects which are sent periodically from the access controller 14 to the subscriber terminal 16.

The access controller 14 may be a local access controller or a national access controller.

The IPPU services may consist of accessing certain sites, streaming media from the sites, downloading multimedia applications from the sites, accessing content resident on the sites, shopping, email, video mail, or the like.

The subscriber terminal 16 may be a cable television set-top box, a digital television or host with point of deployment capability, a personal computer, or the like.

In an alternate embodiment, the subscriber IPPU selection is pre-authorized at the subscriber terminal 16 for a predetermined credit amount. Pre-authorization for IPPU allows a subscriber to request authorization locally. (e.g., in the subscriber terminal 16). The subscriber terminal 16 can subtract the cost associated with the subscriber IPPU selection from the credit amount.

To protect against.repudiation of the IPPU selection, the subscriber terminal 16 can securely report the subscriber IPPU selection back to the access controller 14.

FIG. 2 provides an example of the processing that takes place at the subscriber terminal 16 in a particular embodiment. The subscriber terminal 16 receives the encrypted message from the access controller 14 as discussed in connection with FIG. 1. As discussed above, the encrypted message or a separate message may include the corresponding cost of the IPPU selection. A secure processor 32 located in the subscriber terminal 16 then processes the encrypted message to verify whether the cost of the IPPU selection is within the credit entitlement of the subscriber. If such verification is successful, the subscriber terminal 16 then generates (e.g., by the same secure processor 32) a secure entitlement token for use by the client application 40. The client application 40 is provided with this token by an application layer interface routine (e.g., application program interface 42 running on a user terminal processor kernel 44 at processor 36) which will then send the entitlement token to the server 18 in a secure manner as discussed in connection with FIG. 1. In this way, the server 18 can further validate the legitimacy of the subscriber's entitlement to the requested service. It also provides non-repudiation of the purchase transaction within the subscriber terminal, allowing the Network Operator to have absolute visibility and control of the purchasable services.

Once entitlement to a particular IPPU selection is verified, the IPPU selection content is forwarded to the subscriber terminal 16 by the server 18 as discussed in connection with FIG. 1. The IPPU selection may be received by the secure processor 32 via a conventional receiver circuit (i.e. receiver output of FIG. 2). The secure processor may further process the IPPU content (e.g., if the content associated with the selection is encrypted). Unencrypted content can then be processed in a conventional manner for display (e.g., by a demultiplexer/decoder 34 or by software in the subscriber terminal 16).

A device memory 30 is provided to store local data related to the subscriber terminal 16 and/or purchases made therewith. This memory can also be used to store software and/or firmware associated with the subscriber terminal 16 as well as data being processed by the CPU 36, depending on the particular implementation chosen.

It should now be appreciated that the present invention provides an improved method and system for allowing secure impulse pay-per-use (IPPU) services to be obtained over a communication network. In particular, a subscriber terminal is provided with the ability to generate (e.g., by a secure processor located in the subscriber terminal) a signed and/or encrypted token to be used by an Network Operator's or affiliated ISP proxy server to further validate the legitimacy of a subscriber's entitlement to a requested service or set of services offered by the Network Operator or the affiliated ISP. The invention also provides non-repudiation of purchase transactions via a subscriber terminal, thereby requiring a subscriber to pay for all IPPU services ordered. An intended result is to provide Network Operator's with absolute visibility and control of purchasable services.

Although the invention has been described in connection with various preferred embodiments, it should be appreciated that numerous adaptations and modifications can be made thereto without departing from the scope of the invention as set forth in the claims.

What is claimed is:

1. A method of providing secure impulse pay-per-use (IPPU) services to a subscriber over a communication network, comprising the steps of:
   sending a subscriber IPPU selection from the subscriber to an access controller;
   generating at the access controller an encrypted message having a service identifier and associated authorization settings related to the subscriber IPPU selection;
   communicating said encrypted message from the access controller to a subscriber terminal together with the cost of the IPPU service selected by the subscriber;
   verifying that said cost is within a credit entitlement of said subscriber, and if such verification is successful, generating a secure entitlement token for use by a client application residing in the subscriber terminal;
   securely sending the entitlement token from the client application to a server for determining the status of the subscriber's entitlement; and
   processing the IPPU selection at said server for enabling the selection to be used by the subscriber upon processing of the selection and associated entitlement.

2. A method in accordance with claim 1, wherein the server is one of an independent Internet Service Provider (ISP) proxy/policy server, an ISP proxy/policy server affiliated with a Network Operator's proxy/policy/policy server, or a Network Operator's proxy/policy/policy server.

3. A method in accordance with claim 1, wherein the step of sending a subscriber IPPU selection to an access controller further comprises the steps of:
   sending the subscriber IPPU selection to a billing system;
   conveying the IPPU selection from the billing system to the access controller; and
   billing the subscriber for the IPPU service provided.

4. A method in accordance with claim 3, wherein the subscriber IPPU selection is sent to the billing system using a web browser associated with the subscriber terminal and a web server associated with the billing system.

5. A method in accordance with claim 3, wherein:
   as part of said communication to said access controller, the billing system actuates the access controller to add the service referred to by the subscriber IPPU selection; and
   the step of adding said service is a separate process from that which tells the access controller which subscribers are entitled to access the service.

6. A method in accordance with claim 1, wherein the secure entitlement token is a signed and encrypted entitlement token, which signed and encrypted entitlement token is securely sent from the client application to the server for authentication and decryption.

7. A method in accordance with claim 6, wherein the entitlement token is encrypted using at least one of: (i) private key/public key encryption methods; and (ii) symmetric key encryption methods.

8. A method in accordance with claim 1, wherein the service identifier is associated with one or more service related codes and data objects which are sent periodically from the access controller to the subscriber terminal.

9. A method in accordance with claim 1, wherein the access controller is a local access controller.

10. A method in accordance with claim 1, wherein the access controller is a national access controller.

11. A method in accordance with claim 1, wherein the services comprise at least one of accessing certain sites, streaming media from the sites, downloading multimedia applications from the sites, accessing content resident on the sites, shopping, email, and video mail.

12. A method in accordance with claim 1, wherein the subscriber terminal is one of a cable television set-top box, a digital television or host with point of deployment capability, or a personal computer.

13. A method in accordance with claim 1, wherein the subscriber IPPU selection is pre-authorized at the subscriber terminal for a predetermined credit amount.

14. A method in accordance with claim 13, wherein a cost associated with the subscriber IPPU selection is subtracted from the credit amount.

15. A method in accordance with claim 1, further comprising the step of securely reporting the subscriber IPPU selection from the subscriber terminal back to the access controller.

16. A method in accordance with claim 1, wherein the entitlement token is generated at one of the access controller or the subscriber terminal.

17. A system for providing secure impulse pay-per-use (IPPU) services to a subscriber over a communication network, comprising:
   a subscriber terminal having a client application;
   an access controller for receiving a subscriber IPPU selection; and
   a server, wherein:
   the subscriber conveys the subscriber IPPU selection to the access controller;
   the access controller generates an encrypted message having a service identifier and associated authorization settings related to the subscriber IPPU selection;

the access controller communicates the encrypted message to the subscriber terminal together with the cost of the IPPU service selected by the subscriber;

the subscriber terminal verifies that said cost is within a credit entitlement of said subscriber, and if such verification is successful, the subscriber terminal generates a secure entitlement token for use by the client application residing in the subscriber terminal;

the client application securely sends the entitlement token to the server for determining the status of the subscriber's entitlement; and the server processes the IPPU selection to enable the selection to be used by the subscriber upon processing of the selection and associated entitlement.

18. A system in accordance with claim 17, wherein the server is one of an independent Internet Service Provider (ISP) proxy/policy server, an ISP proxy/policy server affiliated with a Network Operator's proxy/policy/policy server, or a Network Operator's proxy/policy/policy server.

19. A system in accordance with claim 17, further comprising a billing system, wherein:

the subscriber sends the subscriber IPPU selection to a billing system;

the billing system conveys the subscriber IPPU selection to the access controller; and the subscriber is billed for the IPPU service provided.

20. A system in accordance with claim 19, further comprising:

a web browser associated with the subscriber terminal for forwarding the subscriber IPPU selection to the billing system; and a web server associated with the billing system for receiving the subscriber IPPU selection from the web browser.

21. A system in accordance with claim 19, wherein:

as part of conveying the subscriber IPPU selection to the access controller, the billing system actuates the access controller to add the service referred to by the subscriber IPPU selection; and the step of adding said service is a separate process from that which tells the access controller which subscribers are entitled to access the service.

22. A system in accordance with claim 17, wherein the secure entitlement token is a signed and encrypted entitlement token, which signed and encrypted entitlement token is securely sent from the client application to the server for authentication and decryption.

23. A system in accordance with claim 22, wherein the entitlement token is encrypted using at least one of: (i) private key/public key encryption methods; and (ii) symmetric key encryption methods.

24. A system in accordance with claim 17, wherein the service identifier is associated with one or more service related codes and data objects which are sent periodically from the access controller to the subscriber terminal.

25. A system in accordance with claim 17, wherein the access controller is a local access controller.

26. A system in accordance with claim 17, wherein the access controller is a national access controller.

27. A system in accordance with claim 17, wherein the services comprise at least one of accessing certain sites, streaming media from the sites, downloading multimedia applications from the sites, accessing content resident on the sites, shopping, email, and video mail.

28. A system in accordance with claim 17, wherein the subscriber terminal is one of a cable television set-top box, a digital television or host with point of deployment capability, or a personal computer.

29. A system in accordance with claim 17, wherein the subscriber IPPU selection is pre-authorized at the subscriber terminal for a predetermined credit amount.

30. A system in accordance with claim 29, wherein a cost associated with the subscriber IPPU selection is subtracted from the credit amount.

31. A system in accordance with claim 17, wherein the subscriber terminal securely reports the subscriber IPPU selection back to the access controller.

32. A system in accordance with claim 17, wherein the entitlement token is generated at one of the access controller or the subscriber terminal.

\* \* \* \* \*